United States Patent
Mayville et al.

(10) Patent No.: US 7,513,518 B1
(45) Date of Patent: Apr. 7, 2009

(54) ROCKER MOLDING-STEP FOR A VEHICLE BODY SIDE ASSEMBLY

(75) Inventors: Jeffrey Mayville, Ypsilanti, MI (US); David Boucard, Royal Oak, MI (US); Michael Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 465 days.

(21) Appl. No.: 11/460,691

(22) Filed: Jul. 28, 2006

(51) Int. Cl.
*B60R 3/00* (2006.01)

(52) U.S. Cl. .................... 280/163; 280/164.1; 280/166; 280/169; 296/193.07

(58) Field of Classification Search ................. 280/163, 280/164.1, 166, 169; 296/193.07
See application file for complete search history.

(56) References Cited

U.S. PATENT DOCUMENTS

| | | | | |
|---|---|---|---|---|
| 1,297,730 | A | * | 3/1919 | Prince ........................ 280/163 |
| 1,820,324 | A | * | 8/1931 | Punke ........................ 280/163 |
| 2,077,822 | A | * | 4/1937 | Baker ........................ 343/712 |
| 2,122,240 | A | * | 6/1938 | Smith ........................ 280/169 |
| 2,255,880 | A | * | 9/1941 | Gregorie .................... 296/151 |
| 4,203,611 | A | * | 5/1980 | Makela ....................... 280/163 |
| 4,463,962 | A | * | 8/1984 | Snyder .................... 280/164.1 |
| 4,500,274 | A | | 2/1985 | Cyriax et al. |
| 5,265,896 | A | | 11/1993 | Kravitz |
| 5,458,353 | A | | 10/1995 | Hanemaayer |
| 5,511,750 | A | | 4/1996 | Evenson |
| 5,769,439 | A | | 6/1998 | Thompson |
| 5,806,869 | A | * | 9/1998 | Richards .................... 280/163 |
| 5,823,553 | A | | 10/1998 | Thompson |
| 5,952,016 | A | | 9/1999 | Gellert |
| 7,213,826 | B2 | * | 5/2007 | Chuba et al. ............. 280/164.1 |
| 2002/0079667 | A1 | * | 6/2002 | Pohill et al. ................. 280/163 |
| 2002/0101053 | A1 | * | 8/2002 | Lund et al. .................. 280/163 |
| 2002/0195792 | A1 | * | 12/2002 | Hendrix ................... 280/164.1 |
| 2003/0184039 | A1 | | 10/2003 | Schumacher |
| 2004/0100063 | A1 | | 5/2004 | Henderson et al. |
| 2004/0173987 | A1 | | 9/2004 | Chapman et al. |

\* cited by examiner

*Primary Examiner*—Christopher P Ellis
*Assistant Examiner*—John R Olszewski
(74) *Attorney, Agent, or Firm*—Dickinson Wright PLLC; Greg Brown

(57) ABSTRACT

A rocker molding-step (14) for a vehicle body side assembly (12) includes one or more support brackets (30), an elongated molding-step (28), a series of fasteners (74), and an appliqué (76). The fasteners (74) attach molding-step (28) and support brackets (30) to an outboard surface (18) of vehicle body side assembly (12), with the support brackets (30) sandwiched between the molding-step (28) and the body side assembly (12). The molding-step (28) has a stepped surface (72) receiving the fasteners (74). The appliqué (76) is attached to molding-step (28) and covers the fasteners (74). The molding-step (28) is a single-piece blow-molded construction, which covers the vehicle body side assembly (12) and provides a foothold.

20 Claims, 4 Drawing Sheets

ROCKER MOLDING-STEP FOR A VEHICLE BODY SIDE ASSEMBLY

TECHNICAL FIELD

The present invention relates generally to vehicle body side assemblies, and more particularly to a rocker molding-step having a robust blow-molded construction with fewer components, as compared with conventional running boards.

BACKGROUND

Running boards can facilitate ingress and egress from taller vehicles. Typical running boards have a somewhat large number of separate components, which include an elongated step, molding, tread, and a series of fixture devices that attach the elongated step to the vehicle. The molding typically covers only the step. In this regard, the vehicle typically includes separate and additional moldings for the rocker and other body side assemblies.

Existing running boards typically have a somewhat lengthy cantilever arm, which extends from an outboard location where the vehicle occupant steps onto the running board to an inboard location where the running board is attached to the vehicle frame. In particular, the running board typically is mounted to a longitudinal member or other portion of the vehicle frame, which is positioned inboard relative to the body side assembly. It is understood that shortening the length of the cantilever arm can strengthen or improve efficiency of the attachment of the running board to the vehicle. In addition, it will be appreciated that shortening the length of the cantilever arm can also minimize the material and weight carried by the vehicle.

It would therefore be desirable to provide a rocker molding-step having a robust construction featuring a decreased number of components, and which shortens the manufacturing cycle time of vehicles, minimizes costs associated therewith, and enhances the overall vehicle performance.

SUMMARY OF THE INVENTION

A rocker molding-step for a vehicle body side assembly is provided. The rocker molding-step includes one or more support brackets, an elongated molding-step, a series of fasteners, and an appliqué. The fasteners attach elongated molding-step and support brackets to an outboard surface of vehicle body side assembly, with the support brackets sandwiched between the molding-step and the body side assembly. The elongated molding-step has a stepped surface, that receives the fasteners. The appliqué is attached to elongated molding-step and covers the fasteners. The elongated molding-step is a single-piece blow molded construction, which covers the vehicle body side assembly and provides a foothold for vehicle occupants.

One advantage of the invention is that a rocker molding-step for a vehicle body side assembly is provided that has a robust single-piece molding-step for supporting generally high loads and for providing an aesthetically pleasing appearance.

Another advantage of the invention is that a rocker molding-step for a vehicle body side assembly is provided that has a substantially low mass for enhancing vehicle fuel economy and for improving overall vehicle performance.

Yet another advantage of the invention is that a rocker molding-step for a vehicle body side assembly is provided that has substantially fewer components than known running boards, and which thus decreases manufacturing cycle time and costs associated therewith.

Still another advantage of the invention is that a rocker molding-step for a vehicle body side assembly is provided that minimizes noise, vibration, and harshness levels for vehicles.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
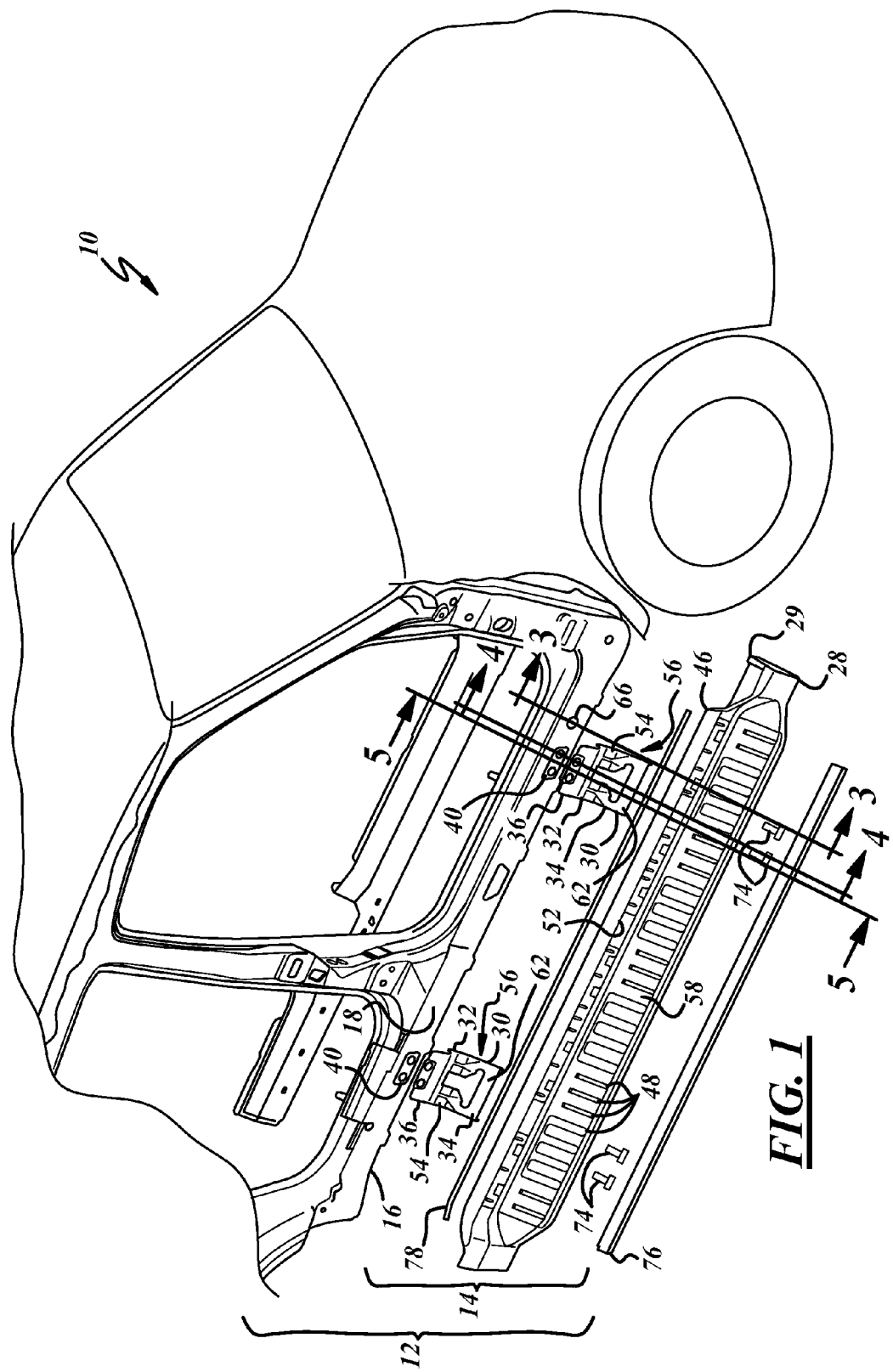
FIG. 1 is a perspective exploded view of a vehicle having a body side assembly with a rocker molding-step, according to one embodiment of the invention.

In the following figures, the same reference numerals are used to identify the same components in the various views.

Referring to FIG. 1, there is shown an exploded view of a vehicle 10 having a body side assembly 12 with a rocker molding-step 14, according to one embodiment of the invention. As detailed below, rocker molding-step 14 has a substantially light and robust construction with generally few parts. These features are beneficial for supporting substantially high percentile occupants, minimizing manufacturing cycle time, decreasing costs associated therewith, and enhancing overall vehicle performance.

Figure 3:
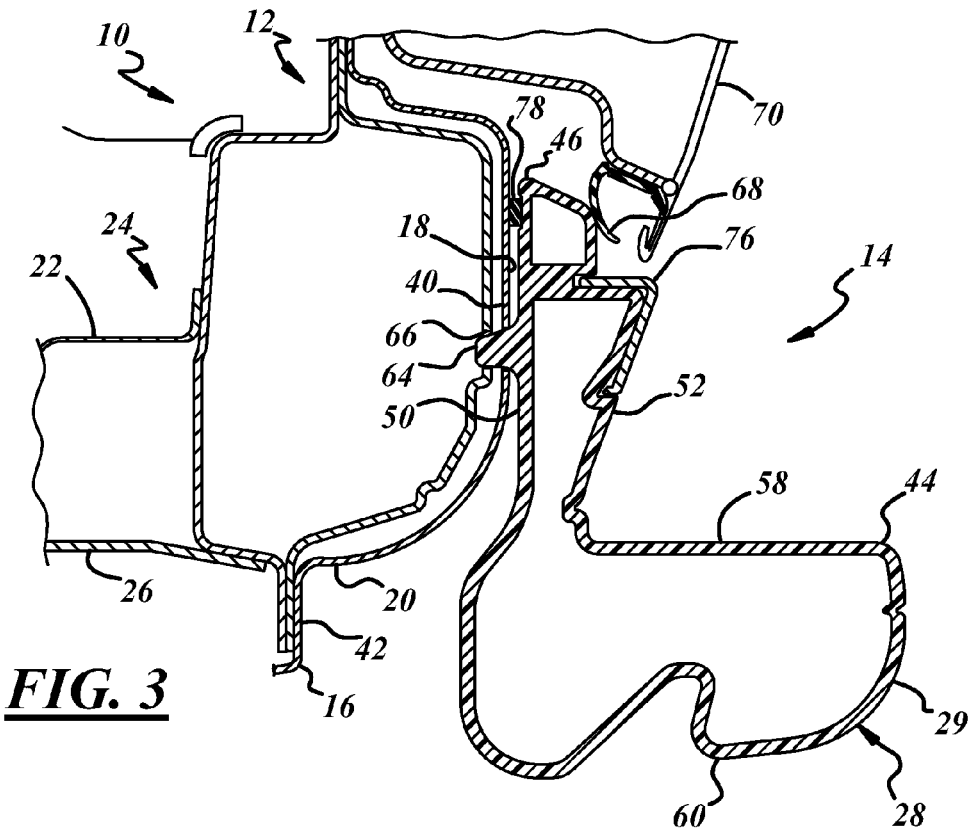
FIG. 3 is a cross-sectional view of the body side assembly shown in FIG. 1 as taken along line 3-3.
Figure 4:
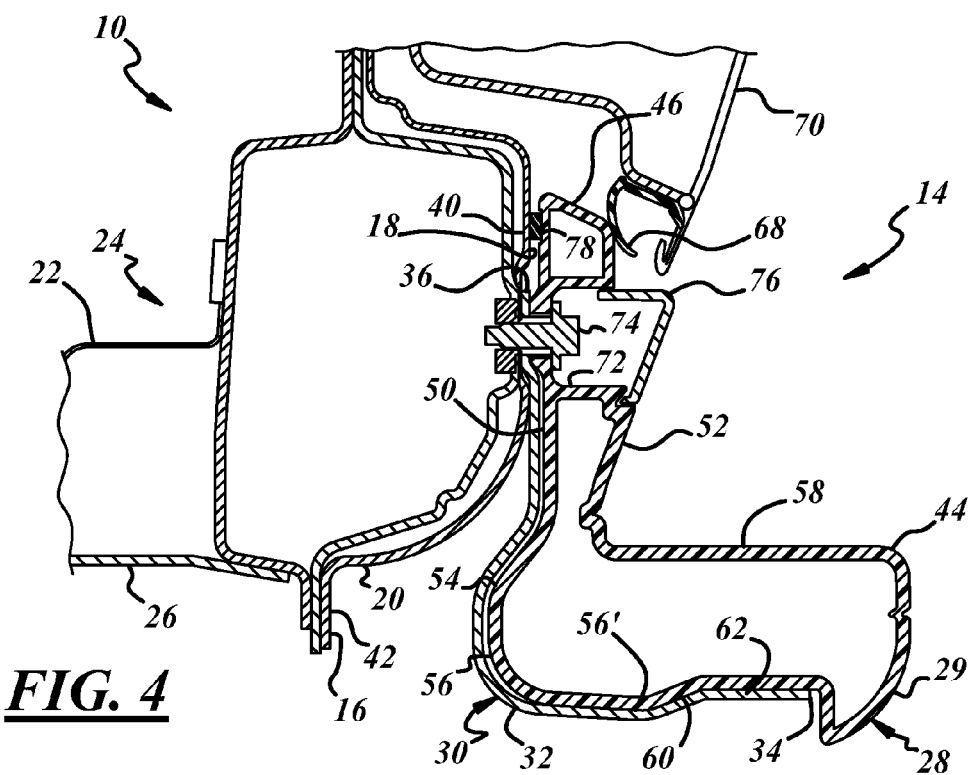
FIG. 4 is a cross-sectional view of the body side assembly shown in FIG. 1 as taken along line 4-4.
Figure 5:
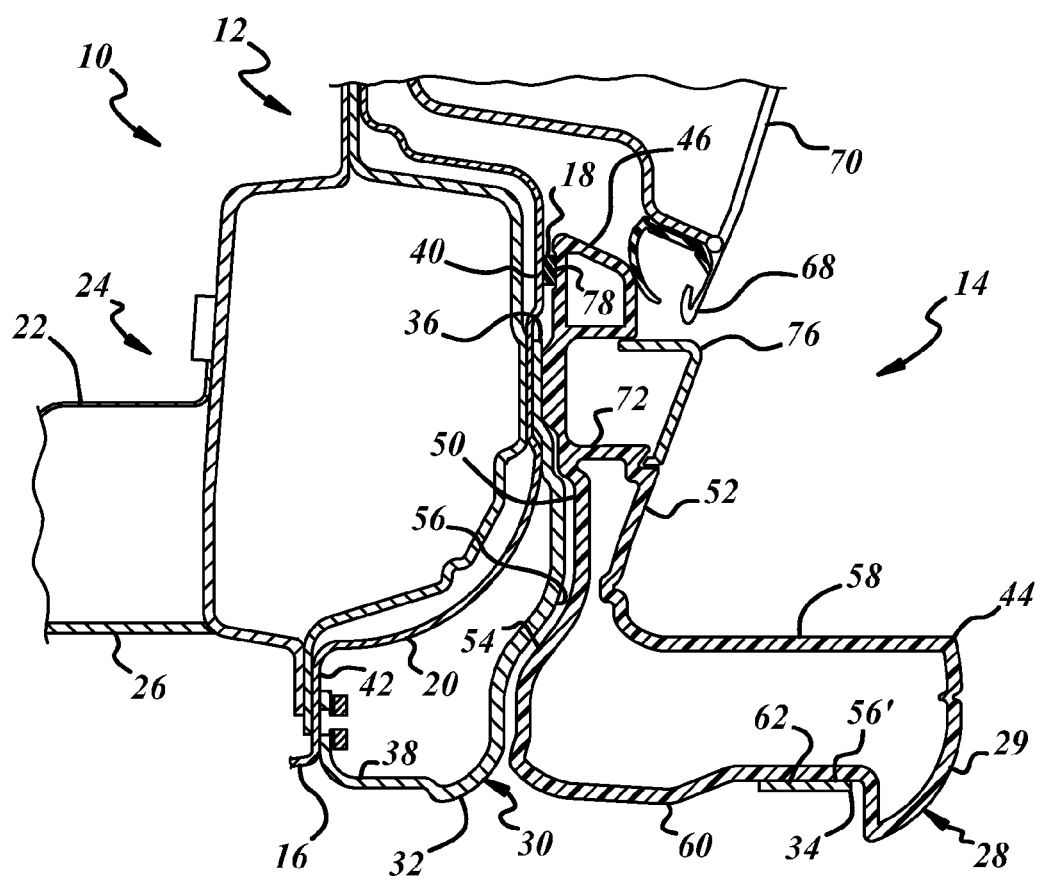
FIG. 5 is a cross-sectional view of the body side assembly shown in FIG. 1 as taken along line 5-5.

As best shown in FIGS. 3 through 5, rocker molding-step 14 provides a substantially short cantilever arm extending outboard from the vehicle 10. In particular, rocker molding-step 14 is directly attached to an outboard surface 18 of a rocker 16 for body side assembly 12. Conventional running boards have substantially long cantilever arms as they extend only from cross member 22 or other portion of the vehicle frame 24 positioned inboard relative to the outboard surface 18 of the rocker 16. Put another way, rocker molding-step 14 is offset outboard from cross member 22 or other underbody structure 26 of vehicle 10.

With attention to FIG. 4, rocker molding-step 14 includes one or more support brackets 30, an elongated molding-step 28, a series of fasteners 74, and an appliqué 76. The fasteners 74 attach molding-step 28 and support brackets 30 to an outboard surface 18 of vehicle body side assembly 12, with the support brackets 30 sandwiched between the molding-step 28 and the body side assembly 12. The molding-step 28 has a stepped surface 72 receiving the fasteners 74. Appliqué 76 is attached to molding-step 28 and covers the fasteners 74. The molding-step 28 is a single-piece blow molded construction, which covers the vehicle body side assembly 12 and provides a foothold for vehicle occupants.

As shown in FIGS. 2 through 5, elongated molding-step 28 is a single-piece construction with a platform portion 44 and a rocker panel portion 46. Platform portion 44 has tread 48 (shown in FIG. 1) for gripping an occupant's foothold and supporting an occupant's weight. Rocker panel portion 46 covers rocker 16 (shown in FIGS. 3 through 5). Both platform portion 44 and rocker panel portion 46 are formed with an aesthetically pleasing appearance. In this respect, the single-piece elongated molding-step 28 dispenses with the need for a conventional elongated step with a separate tread, separate molding for the step, and a separate rocker molding panel for rocker 16.

Referring to FIGS. 4 and 5, support brackets 30 are sufficiently mounted to the vehicle 10 for preventing rotation of running board 14. In particular, each support bracket 30 has a one-piece construction 32 with a stepping platform 34, a first attachment flange 36, and a second attachment flange 38 (shown in FIG. 5). The first attachment flange 36 extends substantially perpendicularly from the stepping platform 34 and is attached directly to a top portion 40 of the outboard surface 18 of rocker 16. As best shown FIG. 5, second attachment flange 38 extends substantially perpendicularly from first attachment flange 36 in an opposite direction from stepping platform 34. Second attachment flange 38 is attached directly to a bottom portion 42 of the outboard surface 18 of rocker 16. In this way, first and second attachment flanges 36, 38 prevent rotation of rocker molding-step 14 on body side assembly 12. Additionally, the one-piece support brackets 30 are beneficial for decreasing manufacturing cycle time and costs associated therewith as conventional running boards typically include multiple component fixture devices.

As best shown in FIG. 4, rocker panel portion 46 of step 28 extends substantially perpendicularly from platform portion 44 and is attached to the first attachment flange 36 of each support bracket 30. Rocker panel portion 46 covers first attachment flange 36 of support brackets 30 and outboard surface 18 of rocker 16. Platform portion 44 covers and is supported by stepping platform 34 of each support bracket 30.

Figure 2:
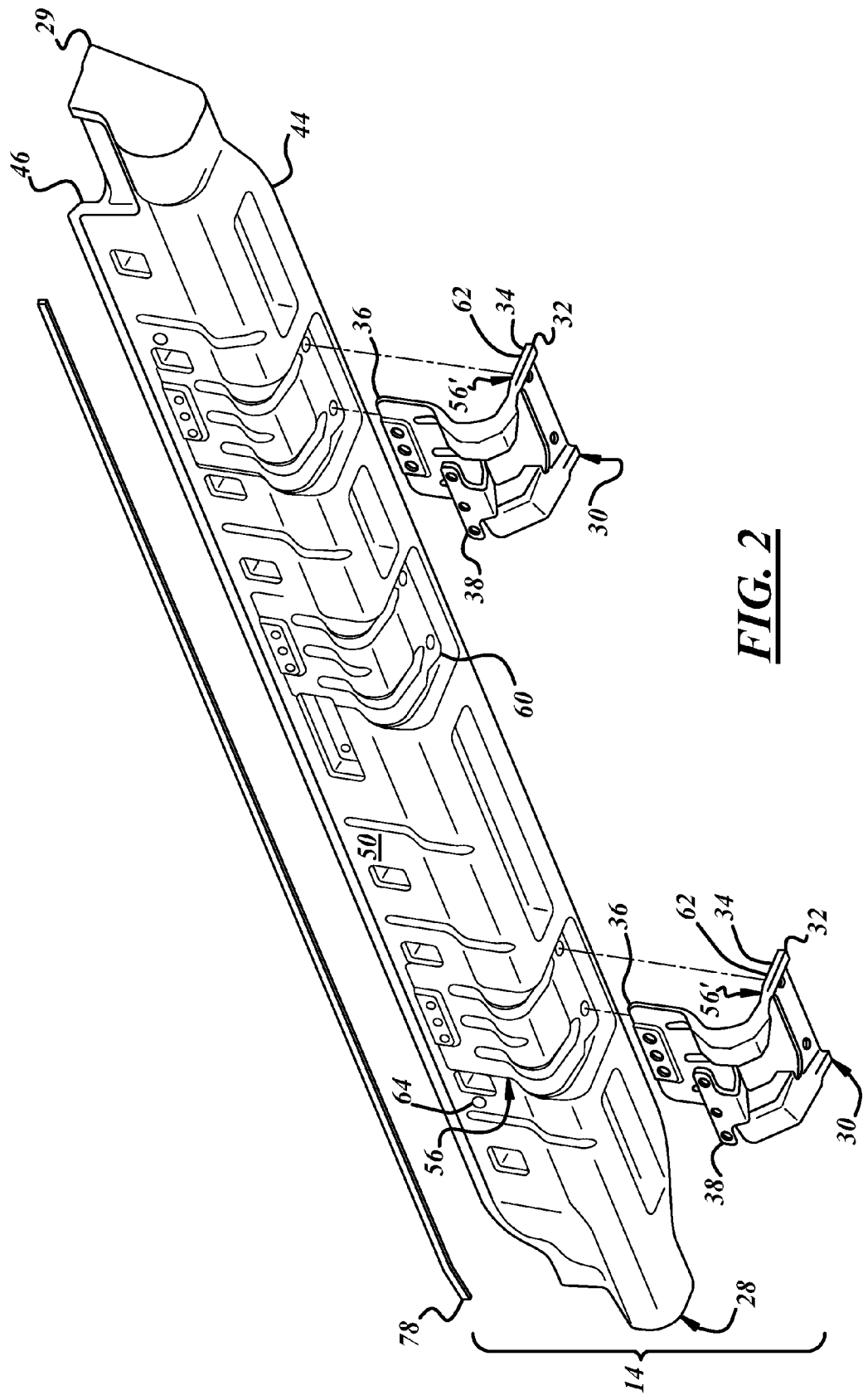
FIG. 2 is an inboard perspective view of the rocker molding-step shown in FIG. 1.

Support brackets 30 are contoured for nesting with elongated step-molding 28. In particular, rocker panel portion 46 of elongated molding-step 28 has an inner surface 50 and an outer surface 52, with the inner surface 50 adjacent to first attachment flange 36 of each support bracket 30. As shown in FIGS. 2, 4, and 5, first attachment flange 36 has an external surface 54 with a predetermined contour 56 that is nested with inner surface 50 of elongated molding-step 28. Further, platform portion 44 of elongated molding-step 28 has a top surface 58 and a bottom surface 60, with the bottom surface 60 supported by stepping platform 34 of each support bracket 30. Each stepping platform 34 has an upper surface 62 with a predetermined contour 56' nested with bottom surface 60 of elongated molding-step 28.

With attention now to FIG. 3, rocker panel portion 46 of elongated molding-step 28 includes a locator protrusion 64 extending into a locator hole 66 formed in the outboard surface 18 of rocker 16. Rocker panel portion 46 further includes an outer surface 52, which compresses a seal 68 against a door 70 (shown in FIGS. 3 through 5) for body side assembly 12.

As best shown in FIG. 4, rocker panel portion 46 of elongated molding-step 28 has stepped surface 72 receiving the fasteners 74 and attaching the rocker molding-step 14 directly to outboard surface 18 of rocker 16. The appliqué 76 is attached to outer surface 52 of rocker panel portion 46 and covers the fasteners 74. The appliqué is snap-fitted into the stepped surface 72, adhesively bonded, or otherwise suitably fastened to elongated molding-step 28.

Referring to FIGS. 2 through 5, rocker molding-step 14 further includes a foam padding member 78 sandwiched between rocker panel portion 46 of elongated molding-step 28 and outboard surface 18 of rocker 16. This feature is beneficial for reducing noise, vibration, and harshness emanating from rocker molding-step 14.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A rocker molding-step for a vehicle body side assembly, comprising:
   at least one support bracket;
   an elongated molding-step covering a portion of said vehicle body side assembly and providing a foothold;
   a plurality of fasteners attaching said elongated-molding step and said at least one support bracket to an outboard surface of said vehicle body side assembly;
   said at least one support bracket sandwiched between said elongated molding-step and said vehicle body side assembly;
   said elongated molding-step having a stepped surface receiving said plurality of fasteners;
   an appliqué attached to said elongated molding-step and covering said plurality of fasteners;
   said elongated molding-step being a single-piece construction formed from a blow molding process.

2. The rocker molding-step recited in claim 1 further comprising:
   said at least one support bracket having a one-piece construction with a stepping platform and an attachment flange;
   said attachment flange extending substantially perpendicularly from said stepping platform and attached directly to said outboard surface of said vehicle body side assembly.

3. The rocker molding-step recited in claim 2 further comprising:
   said elongated molding-step having a platform portion and a rocker panel portion;
   said platform portion covering said stepping platform of said at least one support bracket;
   said rocker panel portion extending substantially perpendicularly from said platform portion;
   said rocker panel portion attached to said attachment flange of said at least one support bracket and covering said outboard surface of said vehicle body side assembly.

4. The rocker molding-step recited in claim 3 wherein said rocker panel portion of said elongated molding-step has an inner surface and an outer surface, with said inner surface adjacent to said at least one support bracket.

5. The rocker molding-step recited in claim 4 wherein said attachment flange of said at least one support bracket has an external surface with a predetermined contour nested with said inner surface of said elongated molding-step.

6. The rocker molding-step recited in claim 3 wherein said platform portion of said elongated molding-step has a top surface and a bottom surface, with said bottom surface supported by said stepping platform of said at least one support bracket.

7. The rocker molding-step recited in claim 6 wherein said stepping platform of said at least one support bracket has an upper surface with a predetermined contour nested with said bottom surface of said elongated molding-step.

8. A vehicle body side assembly comprising:
   said rocker molding-step recited in claim 1; and a rocker having an outboard surface and an underbody surface;

said underbody surface extending inboard from said outboard surface;

said outboard surface attached directly to said rocker molding-step.

9. The vehicle body side assembly recited in claim 8 wherein said rocker panel portion of said elongated molding-step has an inner surface and an outer surface, with said inner surface adjacent to said at least one support bracket and said outboard surface of said rocker.

10. The vehicle body side assembly recited in claim 9 wherein said attachment flange of said at least one support bracket has an external surface with a predetermined contour nested with said inner surface of said elongated molding-step.

11. The vehicle body side assembly recited in claim 9 wherein said inner surface of said rocker panel portion has a locator protrusion extending therefrom.

12. The vehicle body side assembly recited in claim 11 wherein said outboard surface of said rocker has an aperture receiving said locator protrusion of said elongated molding-step.

13. A vehicle comprising:

said vehicle body side assembly recited in claim 8;

an underbody structure offset inboard from said rocker molding-step and said rocker;

a door pivotally attached to said vehicle body side assembly; and a seal sandwiched between said elongated molding-step and said door.

14. The vehicle recited in claim 13 wherein said rocker panel portion of said elongated molding-step has an outer surface compressing said seal against said door.

15. The vehicle recited in claim 13 wherein said underbody structure is a vehicle frame with a cross member offset inboard from said rocker molding-step.

16. A rocker molding-step for a vehicle body side assembly, comprising:

at least one support bracket;

an elongated molding-step covering a portion of said vehicle body side assembly and providing a foothold;

a plurality of fasteners attaching said elongated-molding step and said at least one support bracket to an outboard surface of said vehicle body side assembly;

said at least one support bracket sandwiched between said elongated molding-step and said vehicle body side assembly;

said elongated molding-step having a stepped surface receiving said plurality of fasteners;

said elongated molding-step being a single-piece construction formed from a blow molding process;

said rocker panel portion cushioned against said vehicle body side assembly by a foam padding member.

17. The rocker molding-step recited in claim 16 further comprising:

an appliqué attached to said elongated molding-step and covering said plurality of fasteners.

18. The rocker molding-step recited in claim 16 further comprising:

said at least one support bracket having a one-piece construction with a stepping platform and an attachment flange;

said attachment flange extending substantially perpendicularly from said stepping platform and attached directly to said outboard surface of said vehicle body side assembly;

said elongated molding-step having a platform portion and a rocker panel portion;

said platform portion covering said stepping platform of said at least one support bracket;

said rocker panel portion extending substantially perpendicularly from said platform portion;

said rocker panel portion attached to said attachment flange of said at least one support bracket and covering said outboard surface of said vehicle body side assembly.

19. A rocker molding-step for a vehicle body side assembly, comprising:

at least one support bracket; and an elongated molding-step covering a portion of said vehicle body side assembly and providing a foothold;

a plurality of fasteners attaching said elongated-molding step and said at least one support bracket to an outboard surface of said vehicle body side assembly;

said at least one support bracket sandwiched between said elongated molding-step and said vehicle body side assembly;

said elongated molding-step having a stepped surface receiving said plurality of fasteners;

an appliqué attached to said elongated molding-step and covering said plurality of fasteners;

said elongated molding-step being a single-piece construction formed from a blow molding process;

said at least one support bracket having a one-piece construction with a stepping platform and at least one attachment flange;

said at least one attachment flange including a first attachment flange and a second attachment flange;

said first attachment flange extending substantially perpendicularly from said stepping platform;

said second attachment flange extending substantially perpendicularly from said first attachment flange;

said first attachment flange and said second attachment flange attached directly to said outboard surface of said vehicle body side assembly and preventing rotation of said rocker molding-step;

said elongated molding-step having a platform portion and a rocker panel portion;

said rocker panel portion extending substantially perpendicularly from said platform portion;

said platform portion supported by said stepping platform of said at least one support bracket;

said platform portion formed with a tread pattern;

said rocker panel portion attached to said first attachment flange of said at least one support bracket and covering said vehicle body side assembly;

said rocker panel portion of said elongated molding-step cushioned against said vehicle body side assembly by a foam padding member.

20. A vehicle body side assembly comprising:

said rocker molding-step recited in claim 19; and a rocker having an underbody surface extending inboard from said outboard surface;

said outboard surface having a top portion and a bottom portion supporting said rocker molding-step;

said top portion of said outboard surface attached to said first attachment flange;

said bottom portion of said outboard surface attached to said second attachment flange.

* * * * *